(12) United States Patent
Sivakumar et al.

(10) Patent No.: US 12,147,768 B2
(45) Date of Patent: Nov. 19, 2024

(54) NATURAL LANGUAGE BIAS DETECTION IN CONVERSATIONAL SYSTEM ENVIRONMENTS

(71) Applicant: International Business Machines Corporation, Armonk, NY (US)

(72) Inventors: Gandhi Sivakumar, Bentleigh (AU); Naeem Altaf, Round Rock, TX (US); Wesley M Devine, Durham, NC (US); Rizwan Dudekula, Bommanahalli (IN)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 17/324,043

(22) Filed: May 18, 2021

(65) Prior Publication Data

US 2022/0374604 A1    Nov. 24, 2022

(51) Int. Cl.
*G06F 40/30* (2020.01)
*G06F 16/9032* (2019.01)
*G06N 20/00* (2019.01)

(52) U.S. Cl.
CPC ........ *G06F 40/30* (2020.01); *G06F 16/90332* (2019.01); *G06N 20/00* (2019.01)

(58) Field of Classification Search
CPC .... G06F 40/30; G06F 16/90332; G06N 20/00
See application file for complete search history.

(56) References Cited

U.S. PATENT DOCUMENTS

| 6,278,996 | B1 | | 8/2001 | Howard et al. |
| 10,002,129 | B1 | * | 6/2018 | D'Souza ............... G06F 40/289 |
| 11,151,986 | B1 | * | 10/2021 | Rajbhandari ....... G10L 15/1815 |
| 2012/0089620 | A1 | * | 4/2012 | Castellanos ............ G06N 3/126 |
| | | | | 707/E17.069 |
| 2013/0204813 | A1 | | 8/2013 | Master et al. |
| 2014/0272821 | A1 | | 9/2014 | Pitschel et al. |
| 2014/0310001 | A1 | | 10/2014 | Kalns et al. |
| 2015/0161521 | A1 | * | 6/2015 | Shah ...................... G06F 3/0481 |
| | | | | 715/705 |
| 2017/0242658 | A1 | * | 8/2017 | Kohlmeier ............ G06N 3/006 |
| 2018/0144046 | A1 | | 5/2018 | Braga et al. |
| 2018/0165691 | A1 | | 6/2018 | Heater et al. |
| 2020/0380991 | A1 | * | 12/2020 | Ge .......................... G10L 15/22 |

(Continued)

OTHER PUBLICATIONS

Hou et al., Sequence-to-Sequence Data Augmentation for Dialogue Language Understanding, 2018, arXiv, whole document (Year: 2018).*

(Continued)

*Primary Examiner* — Sonia L Gay (74) *Attorney, Agent, or Firm* — Robert D. Bean (57) ABSTRACT

A method, apparatus and computer program for detecting natural language (NL) bias by a conversational system is described. Embodiments of the invention determine an NL bias in a set of training questions used to train a machine learning model used by the conversational system to select a user intent. Other embodiments of the invention determine an NL bias in a user question received by the conversation system as compared to the set of training questions. The NL bias causes the machine learning to preferentially associate user queries to a user intent. In respective embodiments, the system takes a corrective action to adjust the NL bias of the training questions or the user question.

20 Claims, 7 Drawing Sheets

(56) References Cited

U.S. PATENT DOCUMENTS

| | | | | |
|---|---|---|---|---|
| 2021/0073199 A1* | 3/2021 | Bettaglio | ............ | G06N 7/00 |
| 2021/0304075 A1* | 9/2021 | Duong | ............ | G10L 15/197 |
| 2022/0122588 A1* | 4/2022 | Beaver | ............ | G10L 15/18 |
| 2022/0156634 A1* | 5/2022 | Margolin | ............ | G06N 20/00 |
| 2022/0277741 A1* | 9/2022 | Chaudhary | ............ | G10L 15/22 |
| 2022/0309247 A1* | 9/2022 | Jacob | ............ | G06N 3/09 |
| 2023/0080671 A1* | 3/2023 | Gao | ............ | G06F 40/279 |
| | | | | 704/9 |

OTHER PUBLICATIONS

V. Perera et al., "Multi-Task Learning for Parsing the Alexa Meaning Representation Language." Thirty-Second AAAI Conference on Artificial Intelligence (AAAI-18), pp. 5390-5397.

N. Cingillioglu, "Neural Logic Framework for Digital Assistants." Imperial College London, Department of Computing. MEng Individual Project, Jun. 16, 2017.

J. Bellegarda. "Large-scale personal assistant technology deployment: The Siri experience." In INTERSPEECH, pp. 2029-2033, Aug. 25-29, 2013, Lyon, France.

Kumar, "Bias Detection in Machine Learning Models Using FairML" in DZone, Sep. 20, 2020.

* cited by examiner

NATURAL LANGUAGE BIAS DETECTION IN CONVERSATIONAL SYSTEM ENVIRONMENTS

BACKGROUND OF THE INVENTION

This disclosure relates generally graphical user interfaces. More particularly, it relates to a graphical user interface for finding and depicting individuals.

Artificial intelligent (AI) systems are evolving in the industry to solve a variety of problems. One of those problems is to provide a synthetic interface to applications such as a virtual assistant (VA) or chatbot which simulates a human adviser by providing information in a natural language to the end user. Virtual assistants and chatbots are deployed for a variety of purposes, including helping end users in web site entry and other tasks. One category of tasks is the installation and service of software and physical products.

Typically, the design of a VA or chatbot is done manually using one or more workflows. The workflows are typically hardcoded but may also use tooling provided by a hosting service to provide some of the services offered by the VA or chatbot. A trained machine learning model is used to select among the workflows. A knowledge graph is used in some VAs to encapsulate the information used to select among the workflows. Though knowledge graphs vary in terms of the meaning assigned to the nodes or edges in the knowledge graph, in some knowledge graphs each node represents a set of variations of typical requests made for a specific workflow. In some AI systems, the node in the knowledge graph is assigned to a "user intent" or user goal. A user intent is used to determine which of the workflows should be used in response to a user query. It is common to incorporate rules for traversing the knowledge graph. The rules are applied depending upon various criteria. The rules are applied to allow the VA to find the correct nodes in the knowledge graph to respond back to the user.

Despite all of the layers of control and exhaustive training of the machine learning, it is common for the user to enter questions that cannot be properly interpreted by the VA. One of the issues is that each node is associated with a set of hypothetical user inputs which unintentionally may have a set of biases which lead to the selection of an incorrect (or no) knowledge graph node. While the VA is expected to respond impartially in response to any user input, in reality, the selection of the user intent is biased by the training sets used across the nodes of the knowledge graph. Despite the best intentions of the developers, respective nodes or many nodes may have innate bias because of the training set. This can lead to undesired and unanticipated results as well as user dissatisfaction with such results.

Thus, it is desirable to detect user intent bias in a virtual assistant, chatbot or other conversational system.

BRIEF SUMMARY

According to this disclosure, a method, apparatus and computer program for detecting natural language (NL) bias by a conversational system. Embodiments of the invention determine an NL bias in a set of training questions used to train a machine learning model used by the conversational system to select a user intent. Other embodiments of the invention determine an NL bias in a user question received by the conversation system as compared to the set of training questions. The NL bias causes the machine learning to preferentially associate user queries to a user intent. In respective embodiments, the system takes a corrective action to adjust the NL bias of the training questions or the user question.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, the invention provides a method, system and computer program product for determining user intent natural language (NL) bias in a natural language processing (NLP) based virtual assistant. Embodiments of the invention identify patterns of user intent bias in the NL training sets across nodes for mapped user intents uses a neural parser to identify the patterns at various levels of formation. One output of embodiments of the invention is a set of biased user intents and mapped nodes to which the respective biased user intents are assigned. Another output of embodiments of the invention is one or more sets of NLP for normalization of the biased user intents. In embodiments of the invention, natural language bias is detected during training of the machine model, testing of the machine model or during a production use of the trained model, or a combination of these phases. Further, correction of the detected NL bias is performed in embodiments of the invention.

In the following description, virtual assistant (VA) and chatbot are used interchangeably to describe a conversational system. Embodiments of the invention provide an NL bias free single user intent; other embodiments correct the entire set of NL biased user intents across a knowledge graph once detected. Also, as the input from the user is a natural language text, the user input itself may have a bias in it. Further, the current user input to the VA may have a different NL bias than the NL input used to train the machine learning in the VA.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Figure 1:
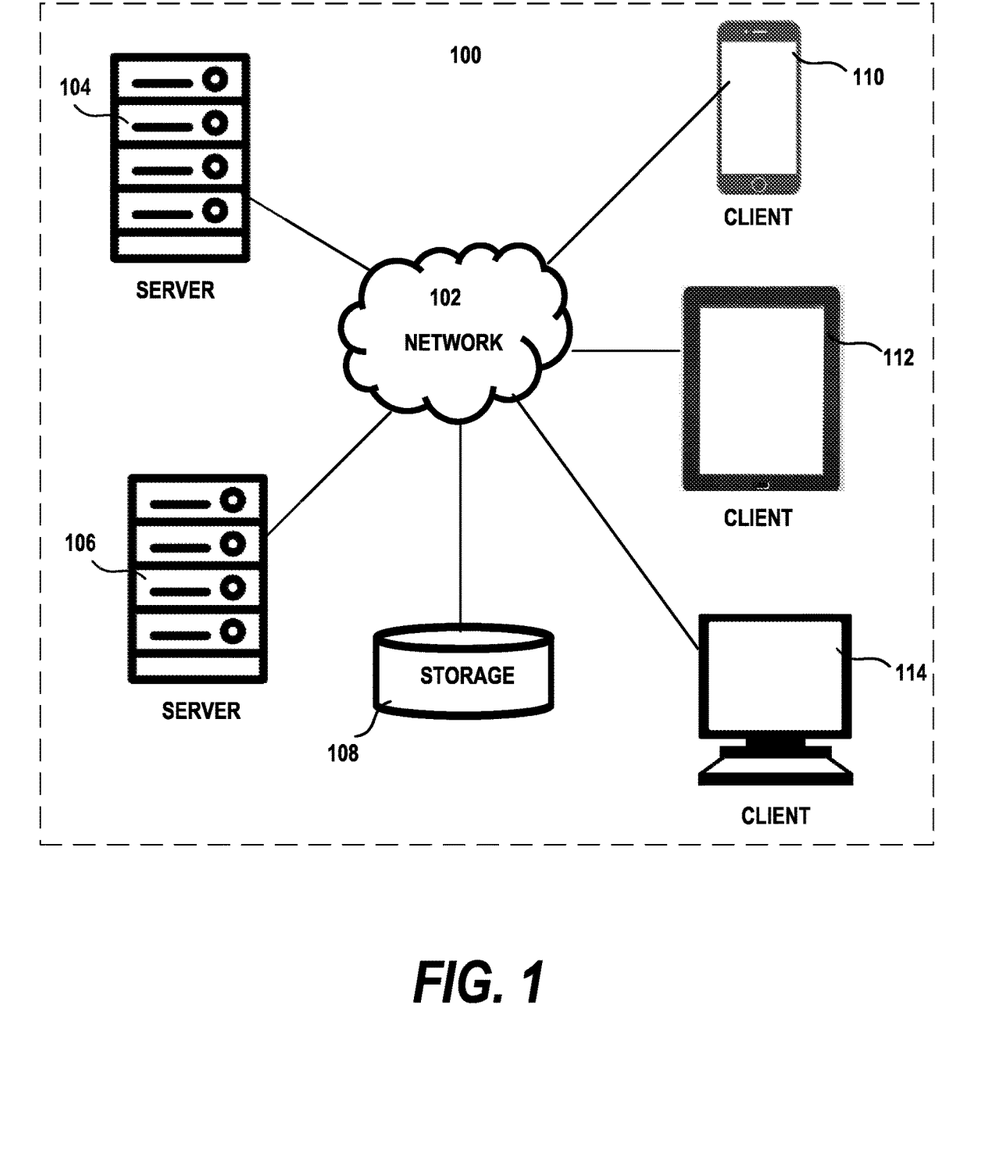
FIG. 1 depicts an exemplary interface for an embodiment of the present invention in which a single individual of interest is shown against an orienting background.
Figure 2:
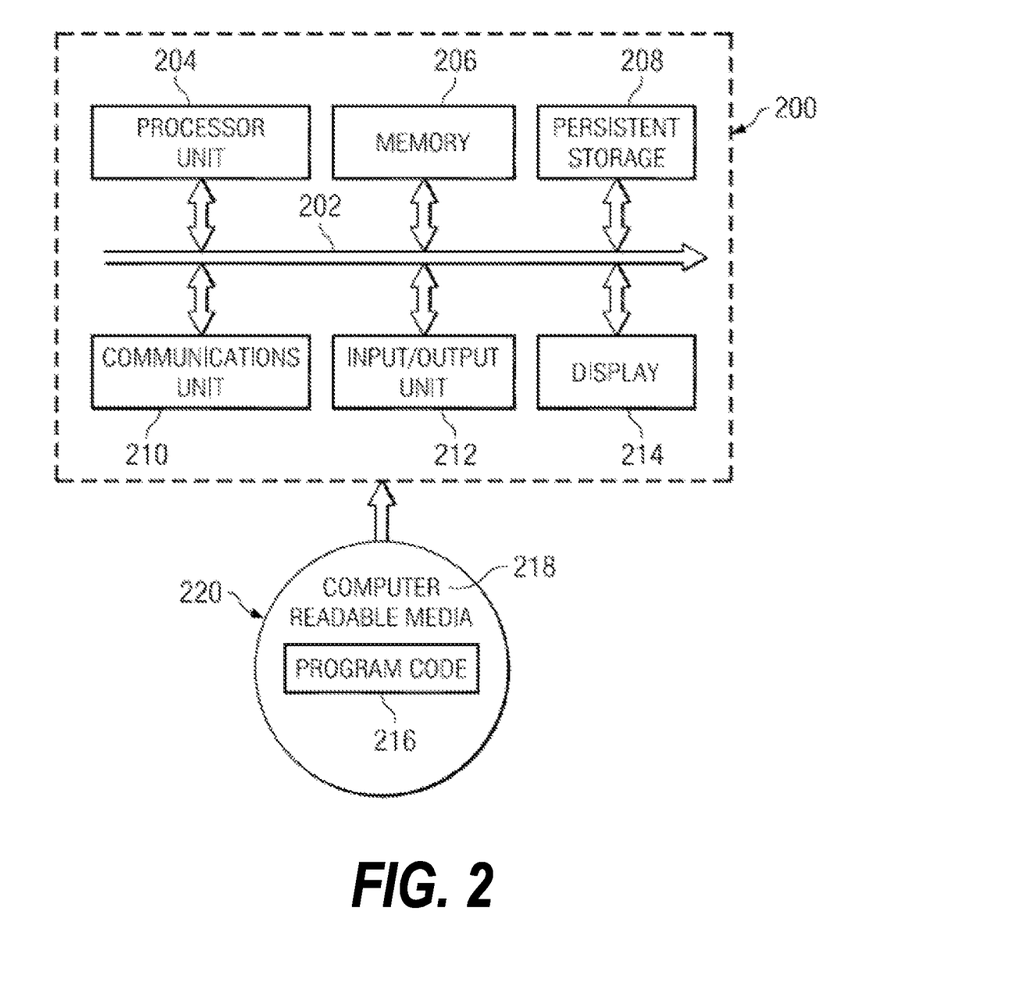
FIG. 2 shows an exemplary interface for an embodiment of the present invention in which two individuals of interest are shown against an orienting background.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 12 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

The prior art has proposed some solutions to the overall problem of bias in machine learning based systems. For example, the FairML framework can be used to determine whether a particular class recognized by a machine learning network is placed at a systematic advantage as compared to other classes recognized by the network.

However, the techniques used by the FairML framework, and other methods known to the inventors, are not well suited to quantify user intent bias in the natural language processing (NLP) portions of a machine learning system in which a chat bot or virtual assistant (VA) system uses to provide system responses to user queries. The machine learning is typically trained using a specific set of natural language (NL) questions or statements. Though the description predominately uses the term "training questions" to describe the training data, one skilled in the art will appreciate that the training data can take many forms, including statements and phrases. This set of training questions may be NL biased in many ways. For example, the training questions used to train the machine learning may have a preponderance of active verb type queries which are matched to the output of the machine learning, e.g., the "goal" or "user intent". Other NL biases are discussed in the description below. Goals or user intent are sometimes embodied in a knowledge graph which is used to provide the system response to a user query. If a user query does not use an active verb, the machine learning may not be able to provide a reliable response for the chat bot to use. For example, either an incorrect response is provided or no response can be provided which meets a required confidence level. Inaccurate system responses are detected in some embodiments by additional user queries indicating that the system response was not understood by the system, e.g., "No, that is not what I meant", "What do you mean?" Other detection methods are used to detect an incorrect response in different embodiments of the invention.

In embodiments of the invention, responsive to detecting a defective response to a user query, a determination is made whether an NL match or mismatch is detected between the user query (ies) and the training set used to train the machine learning for selecting specific user intents. An NL match may be detected in the case where the user question is incorrectly matched to a respective user intent. The NL characteristics of the user question can be a clue of the type of NL bias of the training questions used for the specific user intent. That is, the NL characteristics of the user question may indicate that the training questions have predominately different (perhaps opposite) NL characteristics.

In a supervised environment, an NL mismatch can be detected, because a subject matter expert (SME) training the machine learning will be able to determine the target user intent which should have been associated with the user query. Depending on whether a match or a mismatch is identified the training set of questions for the selected user intent or the target user intent is examined for an NL bias. If an NL bias is identified, a corrective action is taken. In some embodiments of the invention, the corrective action during a production use of a trained machine model is the creation of a normalization "filter" or "algorithm" used to transform the user query to a form which has NL characteristics which more closely conform to the NL training queries used to train the machine learning for the target user intent. In other embodiments of the invention, e.g., during a testing phase, additional NL queries are used to retrain the machine learning to correct the NL bias in either the training set for the selected or target user intent. The additional NL queries can be provided by the SME or can be generated by the system from the original NL queries, using a transformation filter or algorithm. Additional details of these embodiments are provided below.

Embodiments of the invention use a "NL Bias Detector (NLBD) for Virtual Assistants" module. This acronym will be used in the following description. It is intended to include any system which identifies an "NL bias" when comparing the patterns of NL input sets used for training machine learning to the current user input(s), e.g., current, typical user query(ies). In some embodiments of the invention, the NLBD module is used to construct an "ideal" distribution of training data for training the machine model. In other embodiments of the invention, the NLBD module compares the NL characteristics of the current input user query to the training set after a failure of a current, single user query (in a production use). In other embodiments of the invention, the comparison is invoked once a threshold number of defective responses are logged. In some embodiments, the comparison is performed across a set of nodes of user intents (or goals) in a knowledge graph. Some embodiments use a neural parser to identify the NL biases in the nodes.

A typical output of an embodiment highlights the NL biased intents (or mismatches from ideal distributions) in specific mapped nodes. In these embodiments, the system requests user feedback as to whether a normalization process should be performed.

A few examples of NL bias scenarios are described in Table 1:

TABLE 1

| Training Pattern ID | Description | Comment |
|---|---|---|
| Active verb biased | Trained on: "I would like to cancel my phone. Tested on: "I would like to forward my calls" | Intent is biased towards the active sentence verbs and ignores objects. |
| Limited sentence structure | Trained on: "I need to drop a line from my bill and I need to call for my bill." Problem: similar start, similar objects, cause both verbs are treated as the same. | Unable to identify the difference in verbs |
| Improper word weighting | Trained on: "I want this line disconnected". Tested on: "I got disconnected from the chat I was in." Problem: Unable to identify contexts | NLP weighs the term "disconnected" more as compared to the object of the sentence input. |
| In between similar trained active or words in between | Trained on: "I sent my iPhone back today, but the tracking doesn't show yet. I am sure it will by the end of the day. But my service is going to be disconnected. I would like to make a payment arrangement, but it will not let me. I think because the phone is on there. What can I do so my service doesn't get shut off? I don't have $1000." | VA picks the closest trained one as "I want this line disconnected" and classifies incorrectly. When trained with "My service may be disconnected it was able to classify correctly. |
| Positional dependence | Tested on: "I am perturbed as to why my services are interrupted when my payment is due today? I am currently at work and need to be able to use my phone. I was going to pay it this evening once . . . " Problem: VA expects subject, object in same position as training set | Biased towards order of words in training sets. Incorrectly classified words as meaningless "churn". |

TABLE 1-continued

| Training Pattern ID | Description | Comment |
|---|---|---|
| Bag of words bias | User intent gets biased to the bag of words used to train VA | Use of different words by user causes incorrect classification |

Figure 3:
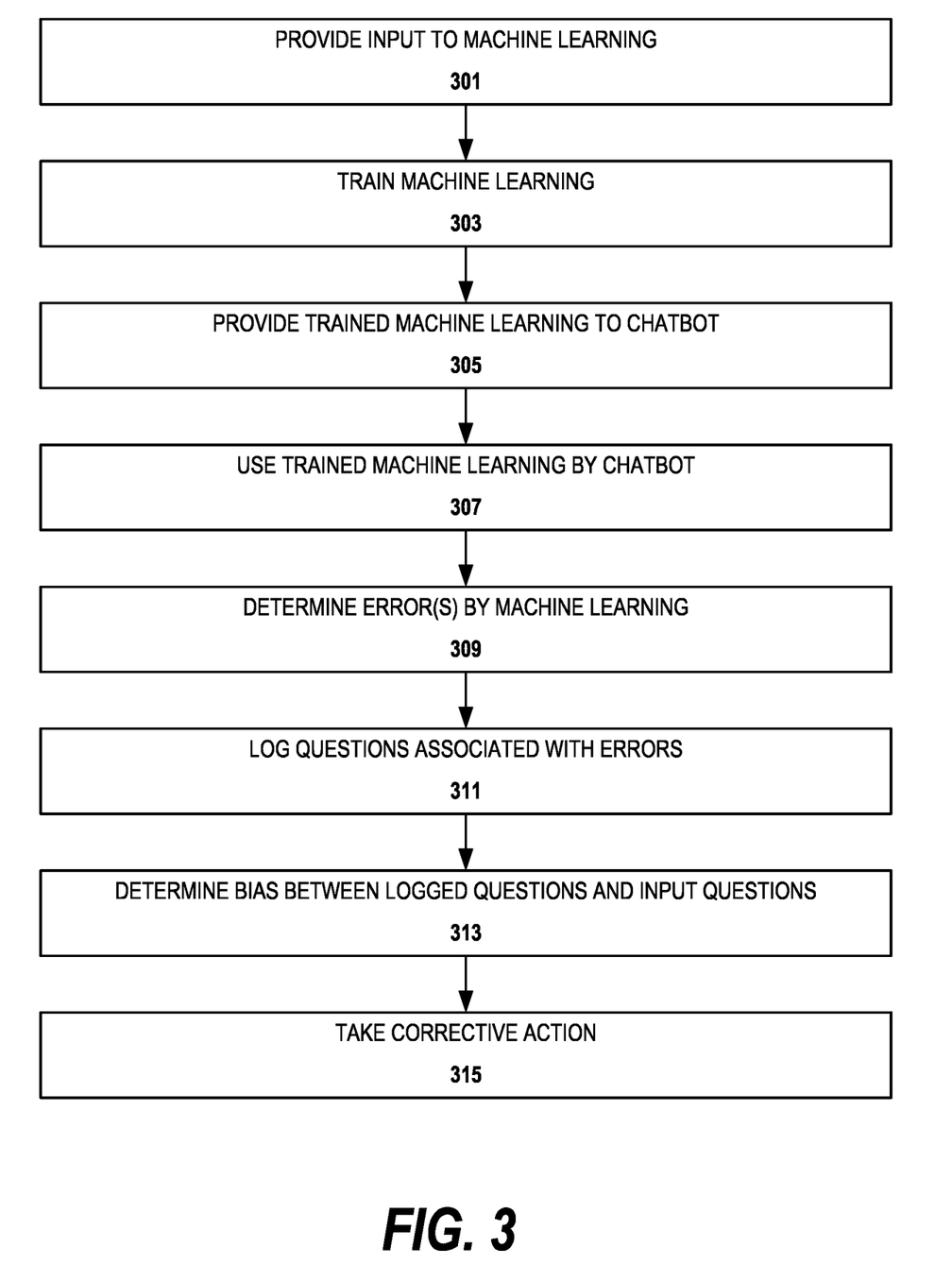
FIG. 3 is a high-level flow diagram of one embodiment of the invention.

FIG. 3 is a high-level flow diagram of one embodiment of the invention. In step 301, the system at the direction of a user provides input to train the machine learning system. Typically, sets of training questions which match respective user intents or goals are provided so that the trained machine learning can select user intents from a knowledge base. Once the user intent is selected, additional actions by the virtual assistant or chat bot are performed. These actions include, but are not limited to, creating system responses in a running chat with a user or calls to a web API to perform an operation or retrieve information for the user.

In step 303, the machine learning is trained using the sets of questions. Most virtual assistants are developed to assist with a specific targeted set of functions, e.g., to assist a user with a specific task or web site. Thus, it is common for each set of questions to be developed specifically for each chatbot as the user goals will differ from web site to web site. Because the set of questions are developed by users who may be more familiar with the workings of the web site than with linguistics, one can easily appreciate that NL biases can easily be created, if for no other reason than the user responsible for creating the training material will have a predilection for certain terms and manners of expression.

In step 305, the trained machine learning is provided to or otherwise integrated with the chatbot which will be interfacing with the user. Next, as is represented by step 307, the trained machine learning model and chat bot are used to interface with one or more users in one or more chats. In some embodiments, the virtual assistant would be employed in a production use with customers interacting with a company web site. Other embodiments use the invention in a testing scenario so that the machine learning model and chatbot can be tested prior to their deployment in a production environment.

Interaction between user and chatbot continues until in step 309, when an error(s), e.g., an inaccurate system response by the machine learning is detected. The error may be a single system response or may be an accumulation of errors which reach a threshold number. In step 311, the system logs or otherwise stores the user questions/input associated with the errors. In some embodiments, the logging may be performed until the threshold number of inaccurate system responses is reached.

In step 313, responsive to the inaccurate system response, the NLBD is invoked to determine an NL bias of the logged user question(s) and/or the set of input questions used to train the machine learning. This step is described in more detail below. At a high level, the NLBD classifies both the logged user question(s) and the set of input questions according to one or more of NL characterization tests. For a respective NL test, the NL classification(s) of respective logged user question(s) and respective ones of the set of training questions will be determined. They can be expressed as a vector or as a distribution. The respective NL distributions can be compared in embodiments of the invention to determine whether there is a NL match or mismatch between the logged question(s) and the training set for either a selected user intent or a target user intent. Where several NL tests are performed, in some embodiments, a greatest mismatch between a value for the logged user question and the set of training questions of the target user intent is used as the indicator of a type of correction which should be performed. In some embodiments, a greatest match between a value for the logged user question and the set of training questions of the selected user intent is used as the indicator of a type of correction which should be performed. If a plurality of NL tests is performed and a subset of the tests show relatively greater matches or mismatches with particular NL characteristics, a plurality of normalizations can be performed. Other implementations will normalize the sets of training questions used for either or both of the selected and target user intents to a desired balanced set of training questions having a variety of NL characteristics, and therefore, minimal NL bias. A training set with minimal NL bias will cause fewer natural language based errors.

In another situation, where a threshold number of logged user questions are stored in response to inaccurate system responses, the respective user questions may have different NL characteristics. Therefore, the respective user questions may indicate that more than one type of correction should be performed to normalize different types of NL bias.

In step 315, the system takes corrective action. Alternatives for corrective actions or normalizations actions are described in greater detail below. At a high level, embodiments of the present invention take one or more types of normalization action. In some embodiments, responsive to the detected match or mismatch, the machine learning is retrained so that it will correctly classify a type of user question as exemplified by the logged user question. Thus, new questions will be either generated by the system or solicited from the user by means of a user prompt. For example, "The NLBD has detected that a system error has occurred because the chatbot is predominantly trained using the active voice. Please provide a set of questions using a passive voice. Here are some examples of passive voice and active voice sentences . . . ".

In one type of normalization action, a filter or transform is applied to the user question. For example, if the system determines that the user question is made in a passive voice and the knowledge graph, or respective node representing a user intent or goal is trained the questions which use an active voice, then a transform algorithm is used to reword the user question into an active voice. In preferred embodiments, the transformation of the user question, is performed in real time, i.e., so that the system makes a timely system response to the transformed user question.

In some embodiments, the NL bias is identified only with respect to certain user intents. Thus, the normalization process can be targeted to only the affected nodes in some embodiments of the invention. In other embodiments, a more general analysis of the entire knowledge graph is performed. An output of this analysis is a set of NL biased user intents and mapped nodes assigned to the respective biased user intents. This set can be presented to the user in list or graphical form together with one or more controls so that normalization operations can be invoked on the NL biased nodes.

In the embodiment described above, NL bias is determined after the machine learning and knowledge graph are put into use, either production use with customers or in a testing scenario. In other embodiments of the invention, an NL test of each node of a knowledge graph is performed to determine the NL distribution(s) of the set of questions and compared to a default, ideal distribution, thus alerting a developer that more questions should be generated for respective nodes before submitting the chat bot and machine learning model for test or production use.

Figure 4:
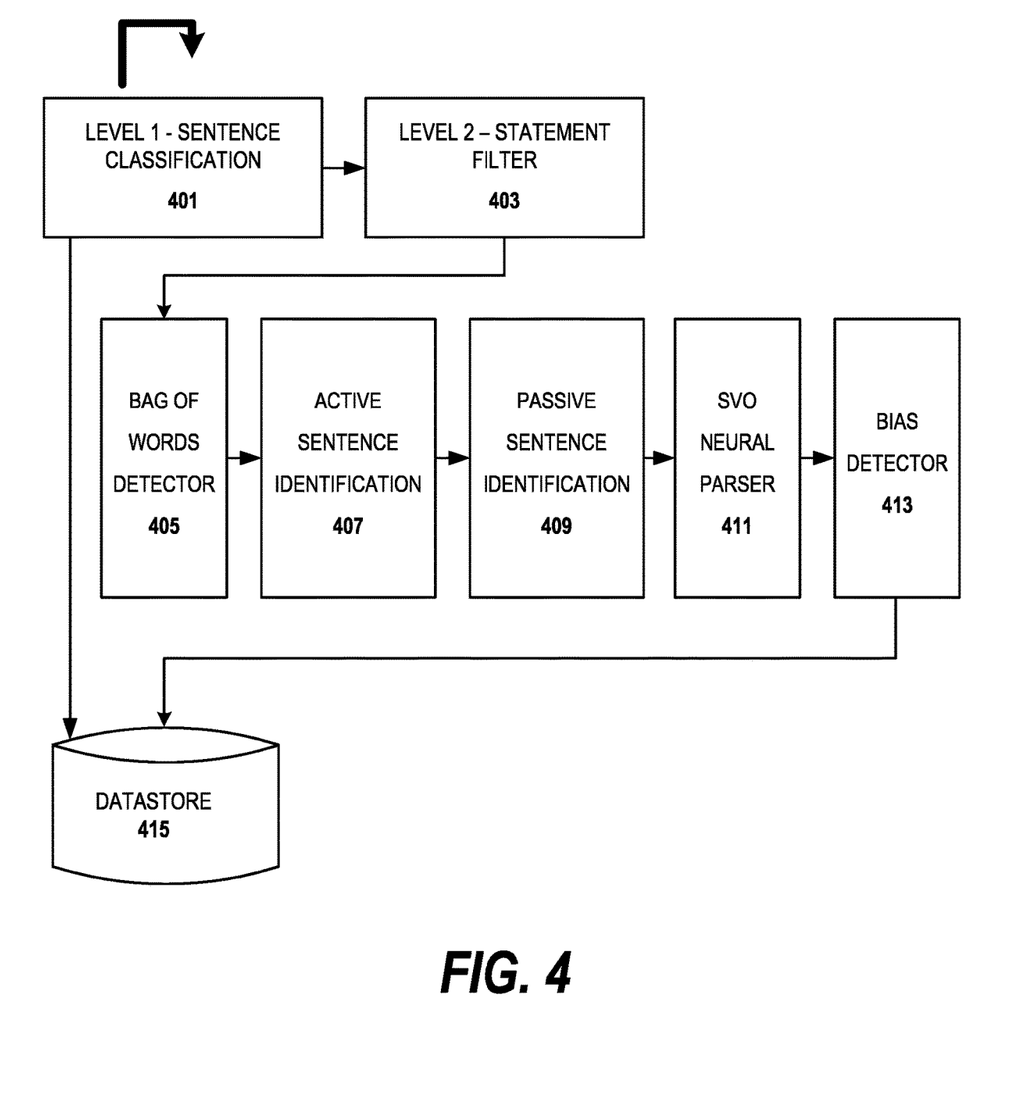
FIG. 4 depicts a system architecture of a pipeline implementation of an NLBD tool.

FIG. 4 depicts a system architecture of a pipeline implementation of an NLBD tool. In this embodiment, after a failure or inaccurate system response is detected, or as requested by the user, the set(s) of training questions associated with the knowledge graph or the specific node representing a user intent is fed through a pipeline of natural language (NL) modules In some embodiments, the current user question(s) is also fed through the pipeline. In yet other embodiments, prior to testing or production uses, all the training questions used by the machine learning for the nodes of the knowledge graph are sent through the pipeline as a preventive measure. That is, before the chatbot and knowledge base are placed in service, the distributions for each node according to each of the NL tests are performed. In these embodiments, it can help the accuracy of the system to correct an initial error. One skilled in the art will recognize that the NL modules depicted in FIG. 4 are representative of the NL tests that can be performed but are not exclusive. Embodiments of the invention will have additional or fewer NL modules; different orders of the modules within the pipeline are used depending on the implementation of the invention.

In the depicted pipeline, the user question(s) and/or set of training questions are sent to the first module in the pipeline, the level 1—sentence classification module 401. The IBM Watson™ natural language classifier is a representation natural language classifier which can be used in embodiments of the invention. Other natural language tools are known to the art and can be used in alternative embodiments of the invention. Sentence classification module 401 allows a user to classify sentences in default or custom categories. Typically, according to the rules established by the sentence classifier, the text of the user question or training question is used to classify the type of sentence used (e.g., active, passive, and so forth). The arrow which returns to the module 401 represents that the sentence classification may be an iterative process. The user question(s) or training questions can be represented as a distribution or vector for the NL characteristics. The match or mismatch between the user question(s) and training questions in different sentence classification categories is calculated in this module in embodiments of the invention.

Next, the user question(s) and training questions are passed to the level 2—statement filter module 403. The statement removal filter 403 filters "noisy" statements which are statements that are irrelevant to the context. In this way, respective ones of the user questions or training questions can be removed from the distribution for a more accurate distribution and/or redetermination of the mismatch. As with any of the modules, the position of the statement filter module 403 and the sentence classification module 401 is interchanged in different embodiments of the invention. Statement filters are known to the art; they filter out useless data such as stop words and score words, phrases and sentences based on their relevancy.

Next, the user question(s) and training questions are passed to the bag of words detector 405. The bag of words detector 405 detects the intent bias for a bag of words used in the set of training questions as compared to the user question(s). A "bag of words" is a representation that describes the occurrence of words within a document. Word counts are tracked but the grammatical details and the word order are disregarded unlike other NL bias measures. The term "bag of words" is used because any information about the order or structure of words in the user question or set of questions is document is discarded. The choice and occurrence of words can bias the set of questions used to train the machine learning. As above, the user question(s) or training questions can be assigned a distribution for the bag of words either causing the error or those on which the node of the knowledge graph is trained. The match or mismatch between word usage in the user question(s) and training questions is calculated in this module in embodiments of the invention.

The user question(s) and training questions are next passed to the active sentence identification module 407 in this embodiment. In the event that the sentence classification module does not provide active sentence classification, a specialized module is added to the pipeline. In other embodiments, specialized modules are added for any desired NL analysis to supplement the sentence classifier. The number of user question(s) or training questions which are active sentences can be assigned a distribution. The match or mismatch between active sentences in the user question(s) and the training questions is calculated in this module in embodiments of the invention.

The user question(s) and training questions are next passed to the passive sentence identification module 409 in the pipeline. In this embodiment, a specialized passive sentence module is added to the pipeline. The number of user question(s) or training questions which are passive sentences can be assigned to a distribution. The match or mismatch between the passive sentences in the user question(s) and the training questions is calculated in this module.

The user question(s) and training questions are next passed to a subject, verb and object parser. In some embodiments, as the one depicted, the parser is a neural parser, i.e., an SVO (subject verb object) neural parser 411. The SVO neural parser 411 parses the user question(s) and training questions to determine the grammatical dependencies. Typically, these dependencies are expressed in a subject-verb-object triplet. The order of subject, verb and object can be used to select the correct node of the knowledge graph. Typically, a question will have a different SVO order than a statement. If the machine learning is predominantly trained on user questions having a specific SVO order for a specific user intent, for example, when a user makes a statement in the user input using a different order, e.g., an SOV order, inaccurate selection of the nodes can occur by the machine learning.

Next, the user question(s) and training questions are passed to an NL bias detector 413. This block in the diagram is intended to illustrate that above listed modules are not exclusive and that other NL biases can be measured. It could represent, for example, converting an active sentence to a passive sentence, retrieving the intent using both active and passive sentences and identifying if there is a change. A change would be an indication that the node is biased. Another example would be changing the bag of words to an equivalent, but different bag of words, retrieving the intent and identifying whether there is a change in intent. If there is a change, that is an indication that the node may be biased for a certain bag of words or a word within the bag of words.

The results of the different modules in the pipeline are stored in the datastore component 415. The output of each module is stored for later use. In embodiments of the invention, the results of the NL bias tests for each node can be stored as part of a deployment of the virtual assistant. These results can be reviewed before deployment to determine whether additional user questions need to be submitted to the machine learning for the knowledge graph or for respective nodes of the knowledge graph. In the alternative, the stored results may be more convenient or expedient in the production environment to determine an NL bias, since only the NL categorization of the current user question needs to be performed, rather than all of the user questions used during the training of the machine learning. Once the current user question is classified, the results from the database 415 can be retrieved.

Figure 5:
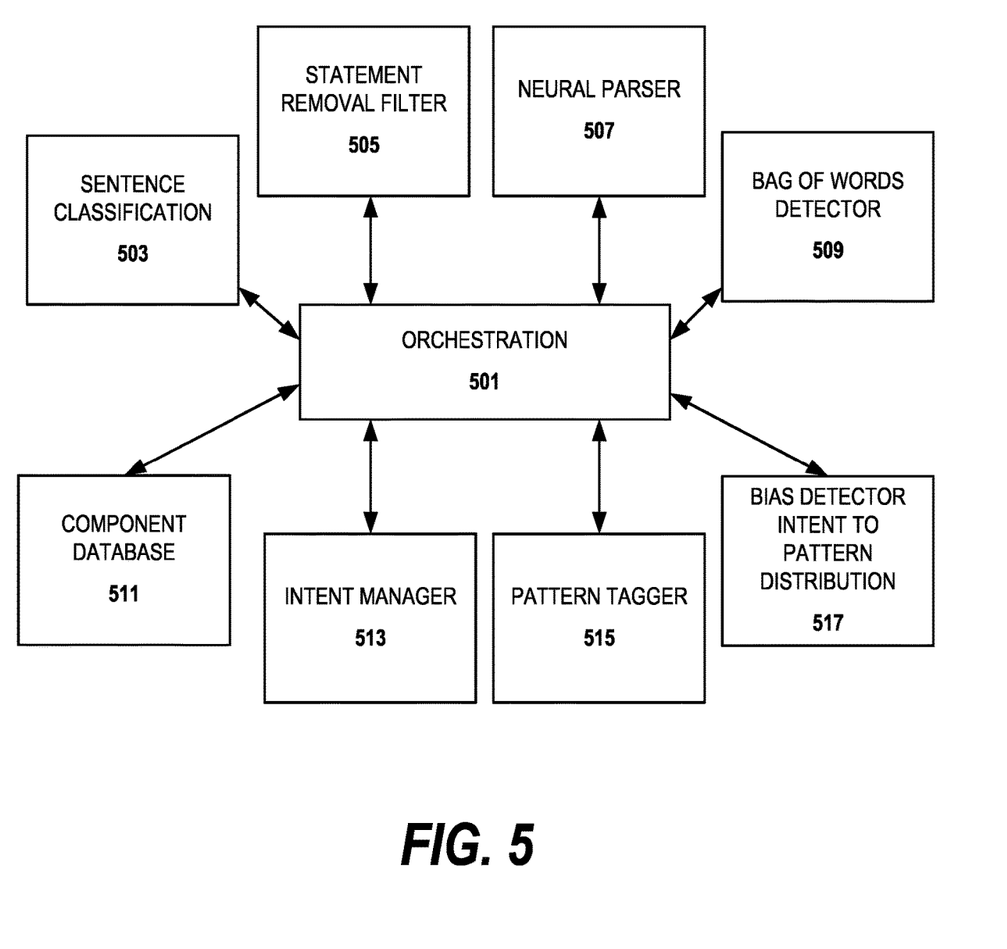
FIG. 5 depicts a system architecture of an orchestrator implementation of an NLBD tool.

FIG. 5 depicts a system architecture of an orchestrator implementation of an NLBD tool. This embodiment differs from the one described above as the orchestration module 501 selectively calls the other modules as needed. That is, only a selection of modules is called in response to a particular failure. The remainder of the modules provide functions similar to those described above in the pipeline embodiment. If sentence classification is indicated, the orchestration module 501 calls the sentence classification module 503, e.g., with the set of user questions which need classification such as declarative sentences or imperative sentences. The orchestration module 501 may call the statement removal filter 505 to filter the "noisy" statements irrelevant to the user context prior to sending them to any of the other modules.

The orchestration module 501 calls the SVO neural parser 507 to parse the user question(s) and training questions to determine their respective subject-verb-object grammatical dependencies. The bag of words detector 509 is called to determine the sets of words used in the user question(s) and training questions. The bag of words detector can determine that an individual word is having too much influence in selecting the user intent.

The orchestrator implementation of an NLBD tool in FIG. 5 shows some different modules than the pipeline embodiment which may be utilized in embodiments of the invention. The intent manager 513 is called to extract the mapped user intents to the training questions/sentences used by the subject matter expert (SME) to train the machine learning for the nodes of the knowledge graph. The pattern tagger module 515 is called if needed to identify the pattern of the training questions/sentences in a plurality of ways not performed by the other modules, e.g., complex pattern-based extraction, statistical or token based extraction. The bias detector 517 maps user intent expressed in the knowledge graph to the pattern distributions identified in the other modules.

While the pipeline and orchestrator embodiments are portrayed in separate figures, in some embodiments, they function as different modes of the same NLBD. For example, the pipeline mode may be used to characterize the training questions used to train the machine learning to select between the respective user intent nodes either to evaluate the knowledge graph or to make further normalization actions more timely. Once the NLBD is used in conjunction with the trained chat bot, it may be more expedient to operate in the orchestrator mode so that only the needed NL modules are called. In some embodiments, the NLBD will have different modules for pipeline and orchestrator tasks.

Figure 6:
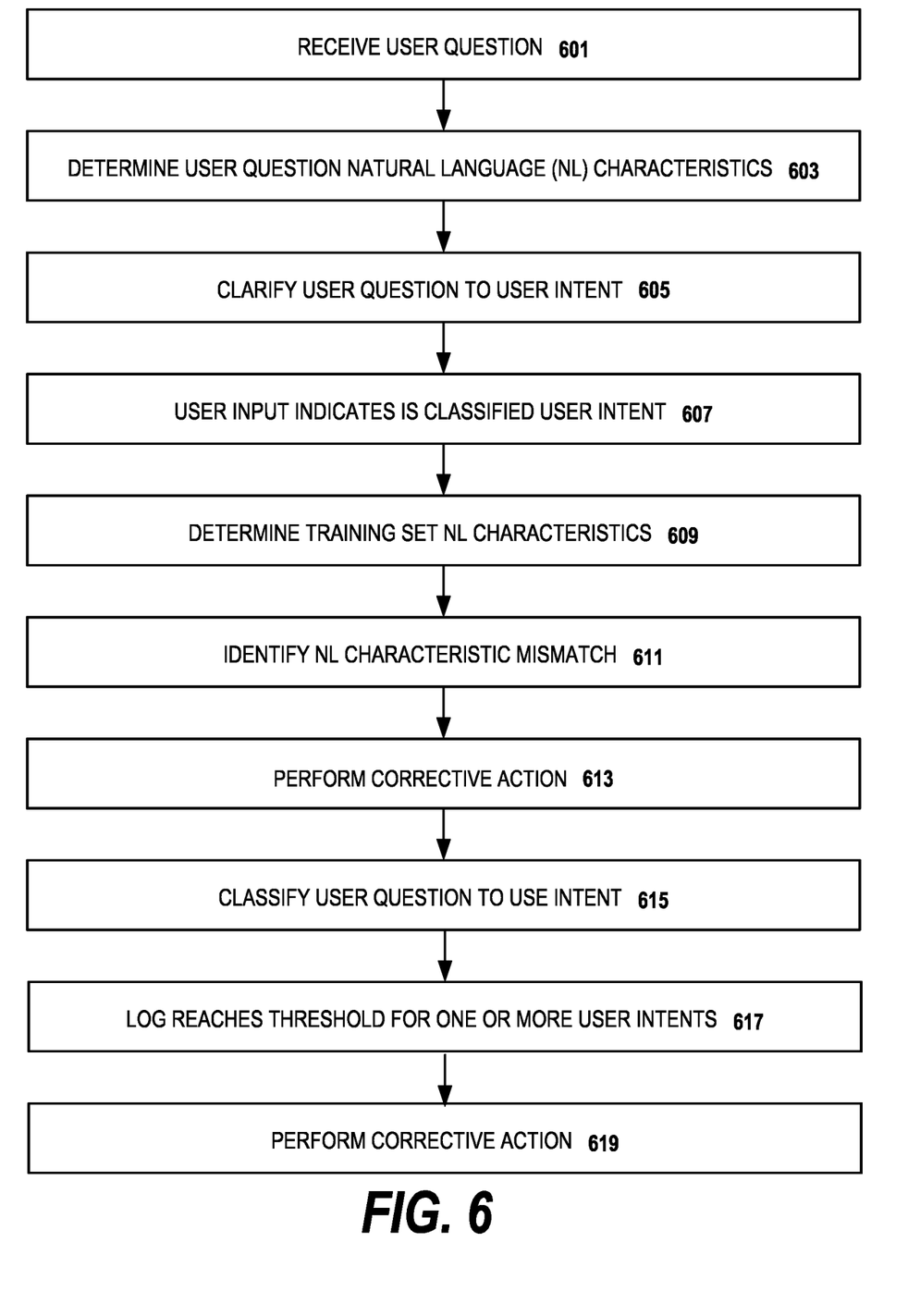
FIG. 6 is a flow diagram of one embodiment of the invention according to an embodiment of the invention.

An example embodiment of the invention detecting an NLP-based user intent bias in a knowledge graph is described below and depicted in FIG. 6. As is mentioned above, a typical VA which uses a knowledge graph or neural network can make errors because of NL biases created when the machine learning learns how to select among the nodes. Embodiments of the invention are used to identify and take corrective action in such scenarios. NL bias can be created by the training questions using a particular sentence structure. In the example, there are many active sentences in the training set and very few passive sentences for a target node/user intent. Thus, when a passive sentence is used which should be handled by the target node, an incorrect result may be obtained. This can be due to the machine learning placing a greater importance on the active sentence structure and giving less importance to other important information, since the other information is not present as many times in the training set as the active sentence structure. According to the invention, any NL characteristic which is present in a preponderate number of training questions can create an NL bias by the VA.

The VA receives a user question, step 601. The NLBD determines the natural language characteristics, e.g., that the user question is in a passive sentence structure, step 603. When the machine learning matches the user question to a user intent in the knowledge graph it classifies the user question as related a first user intent, Intent-1, step 605. This, however, is an incorrect association which results in an incorrect response by the VA to the user. With further interactions between the VA and user, step 607, the system establishes that the user question is misclassified as Intent-1 and that some other user intent was desired.

Responsive to an incorrect response detection, the NLBD is used to determine the NL bias of the training set for Intent-1, step 609. It identifies the reason for the misclassification as a mismatch between the sentence structures used in training as compared to the current user question. In the training set, eighty percent of the training examples labeled for the Intent-1 are passive sentences. The machine learning is giving more importance to the structure (Active/Passive) of the sentence than to other information in the training set and is NL biased towards passive sentences being associated with intent 1. Thus, the user questions submitted into the system in the passive voice have a greater chance of being misclassified as Intent-1 as this user intent is biased towards the passive voice sentence structure. In response to the match/mismatch detection, a corrective action is performed, step 613. In this example, the corrective action is to change the passive sentence structure of the user query. In step 615, when the machine learning matches the user question to a user intent in the knowledge graph it now classifies the user question as related a second user intent, Intent-2. Assuming that no unfavorable feedback is received from the user, the VA will assume that the classification is correct.

In this example, the user queries and system responses are logged. Once the log reaches a threshold, step 617, a corrective action is performed, step 619. A threshold can be a predetermined number of user queries classified for a particular user intent, or a predetermined number of user queries since a last retraining of the machine learning. In the example, the corrective action selected by the system is to retrain the machine learning with a balanced distribution of the sentence patterns and other NL characteristics in the training data set. Instead of a balanced distribution, the distribution may be selected to resemble the NL characteristics of the latest set of user queries successfully classified more closely to a particular user intent.

The NLBD uses the present training set with which the machine learning is trained for one or more user intents to generate a new set of sentences with an active voice. In other embodiments, where an overall threshold is used, the NLBD uses the present training set for each of the user intents to generate a new set of sentences for whatever types of sentences are needed for a more balanced or appropriate set of training questions.

A neural parser is a component of tools which convert sentences from one pattern to another pattern. Representative neural parsers include part of speech (POS) taggers, parse tree based parsers, and dependency parsers. The parsers are used to understand the current sentence structure and to convert the current sentence structure to some other sentence structure patterns (or other NL characteristics) without changing the user query or training sentence meaning.

In alternative embodiments, the corrective action is for the system to prompt the user to supply additional sentences for training the machine learning to classify the user intent. Once the additional sentences are received, the machine learning is retrained.

Figure 7:
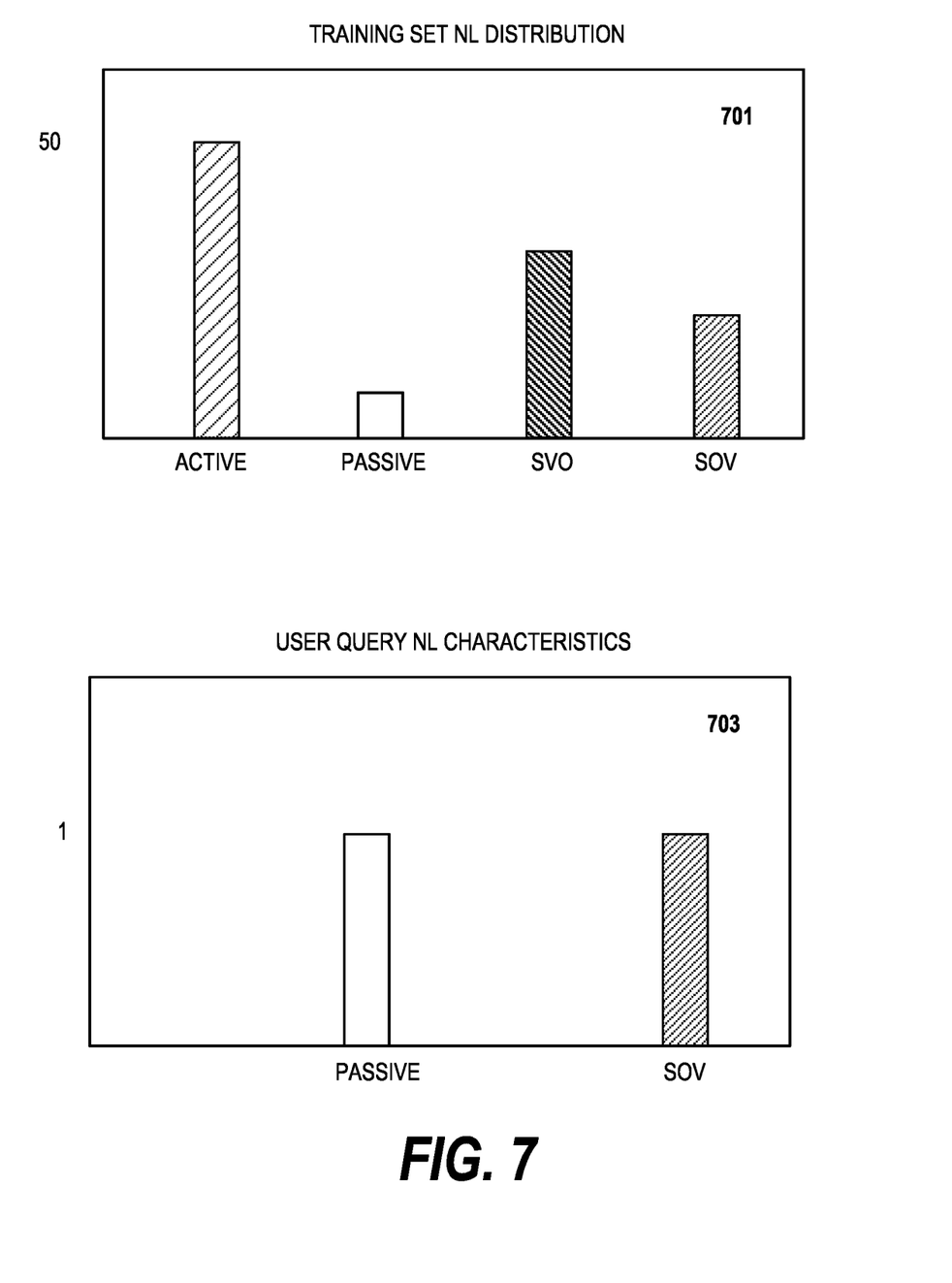
FIG. 7 shows a training set distribution of natural language characteristics compared to a user query distribution of natural language characteristics.

FIG. 7 shows a training set distribution of natural language characteristics compared to a user query distribution of natural language characteristics. As one skilled in the art will appreciate, the example is simplified. Many more NL characteristics can be used to characterize the training set of questions and/or the user query. In this embodiment, embodiments of the invention are used to provide a more "ideal" distribution of NL characteristics. Note that an "ideal" NL distribution can be arbitrary choices in an implementation or can be based on determinations of typical NL characteristic distributions for a natural language or for a particular domain (e.g., technology, entertainment, sports) using a particular natural language.

In the training set distribution 701, in aggregate, the training set questions for a particular user intent have many more active sentences than passive sentences. Further, the training set has many more sentences which are arranged in a subject-verb-object (SVO) order than in a subject-object-verb (SOV) order.

A user query is received. The user query characteristics 703 include a passive sentence form and a subject-object-verb (SOV) order. Based on the NL characteristics, the machine learning will be biased against assigning the user query to the particular user intent displayed in the training set distribution 701, even if other information in the user query indicates that it should be assigned to the user intent. This NL bias can lead to inaccurate result.

In embodiments of the invention, the NLBD tool is used to create a balanced set of typical sentence structures by determining whether initial or current set of training questions for each intent has a balanced distribution of the sentence patterns in the training data and if not use tools that convert sentences from the current set to new sentences having the missing sentence structure. In addition to the active and passive sentence types, it is desirable in embodiments of the invention to have a distribution of training sentences in the following categories: declarative sentences, imperative sentences, interrogative sentences, and exclamatory sentences.

In embodiments of the invention, the system logs all user questions whether they have been correctly matched to the desired user intent or misclassified by the VA together with their disposition, e.g., success, failure, user intent selected (if any). The logged user questions as can be grouped according to the user intent and analyzed by the NLDB for sentence structure and other natural language characteristics. Then, a similar analysis is performed for the training questions used for that user intent. If a mismatch found, the logged questions can be used to retrain the machine learning. Embodiments of the invention allow adjustments to be made to the training set to more accurately reflect the NL characteristics of the customer set who actually use the virtual assistant. In some cases, the NLBD can be used to create a balanced set of training questions during development of the machine learning for the VA. Through the user query logs, the NLBD can determine that the actual users employ a distinct, unanticipated bag of words when requesting a particular user intent. Or the VA may service a locale where the native language tends to use a different sentence structure than the sentence structure used by the developers. The NLBD can detect the NL mismatch between the log of user queries and the training questions to reflect the measured NL biases of the customer set to obtain the most accurate results, though the resulting training set may be less ideally balanced when compared to a default mixture of sentence types.

In some embodiments of the invention, a failure of the VA is not required to start the NLBD. When the current user query comes to the system, after user intent classification is performed by the VA, the NLBD checks for the sentence structure and other NL characteristics of the user query and compares with the patterns of training sentences for the selected user intent. If any unusual pattern is seen, e.g., poor distribution of sentence types, or there is a mismatch between the user query and the training sentences (despite the successful selection of the user intent), it will be logged. These logs will be used to improve the machine learning in the next training iteration.

In some embodiments, once the user query/training sentence mismatch or failure is detected, the only current user query undergoes a normalization process. Instead of retraining the machine learning, a conversion tool is used to convert the current user query to a sentence structure like those used in the training set, for example, changing a passive sentence to an active sentence.

Where a bag of words bias is detected, the machine learning model may give more importance to (biased towards) the bag of words used in the training set; a user query using words from the bag of words may be misclassified. In addition, sometimes a keyword or an unusual word appears in the bag of words for a specific node and no other nodes (or is used less frequently in the other node's training sets). The overly used keyword or unusual word can be given more importance than it should be given in the selection process. What can happen is that user questions using the unusual word are misdirected to the specific node in preference to the node which more closely represents the user intent. In this situation, the NLBD identifies the biased bag of words from training set data and finds the similar terms using synonym tables and word embeddings. New sentences are developed to retrain the machine learning creating a more balanced set of training data. This helps avoid a situation that certain keywords are overly used in the training for a particular user intent. Tools and libraries are available to provide semantically similar words that can be used to transform the training sentences with overly used keywords with its synonyms/semantically semantic words.

In some embodiments of the invention, the NLBD is part of a suite of tools which assist the machine learning and VA. For example, the NLBD could be a component in the IBM Watson Assistant™ set of tools used for creating virtual assistants and chatbots. There are other companies which offer similar suites of products in which the NLBD can be incorporated.

The order of steps in which the method is described is not intended to be construed as a limitation, and any number of the described method blocks may be combined in any order to implement the method, or an alternate method. Additionally, individual blocks may be deleted from the method without departing from the spirit and scope of the embodiments of the invention.

One skilled in the art will understand that the division of tasks between the modules is exemplary, and that other embodiments of the invention will divide the tasks differently. Further, in describing exemplary processes below, the order in which the processes are described with reference to the flow diagrams is not intended to be construed as a limitation, and any number of the described method blocks may be combined in a different order to implement the method, or alternate method. Additionally, individual blocks may be deleted from the method without departing from the spirit and scope of the subject matter described herein.

Embodiments of the invention have many advantages over the prior art. In some embodiments, an NLBD can be used as a development tool to assure that the training sets of questions used to train the machine learning to select among nodes of the knowledge graph. In other embodiments, an NL-bias mismatch between a user query and the training questions can be detected when the VA is in a testing or production use with an actual user. In yet other embodiments, corrections to the sets of training questions during a retraining phase, to more closely reflect the NL characteristics used by a particular customer set. Embodiments of the invention can detect NL bias in a training phase, a testing phase and/or a production phase as described herein.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for detecting natural language (NL) bias by a conversational system comprising:
   determining an NL bias in one of either a set of training questions used to train a machine learning model used by the conversational system;

selecting a user intent or a user question received by the conversational system;

determining NL characteristics of the user question and NL characteristics of the set of training questions;

comparing the NL characteristics of the user question to the NL characteristics of the set of training questions;

identifying the NL bias associated with the machine learning model to preferentially associating the user queries to the user intent; and adjusting the NL bias of the training questions or the user question by performing a corrective action, wherein performing the corrective action is based on identifying a distribution of intents, and wherein the corrective action includes retraining the machine learning model; and correctly classifying, by the retrained machine learning model, a type of user question as exemplified by the user question.

2. The method as recited in claim 1, wherein the corrective action further comprises selecting a normalizing algorithm based on a determined type of NL bias to compensate for the determined NL bias.

3. The method as recited in claim 1, wherein the corrective action further comprises:

responsive to the determining, generating a new set of training questions with NL characteristics selected to be different than the set of training questions; and retraining the machine learning using the new set of training questions.

4. The method as recited in claim 1, wherein the corrective action further comprises applying a normalizing algorithm to the received user query so that the NL characteristics of the normalized user query more closely correspond to the NL characteristics of the set of training questions so that the machine learning will associate the user query to a different user intent.

5. The method as recited in claim 1, further comprising: providing an NL bias detection function utilizing a pipeline staging including a sentence classification module, a filtering module, a bag of words module, and a subject-verb-object (SVO) neural parser.

6. The method as recited in claim 2, wherein the selecting further comprises selecting from a plurality of normalization algorithms wherein the selected normalizing algorithm compensates for the determined NL bias.

7. The method as recited in claim 1, further comprising providing an NL bias detection function which selectively invokes a set of NL bias components based on a determined type of NL bias to compensate for the determined NL bias.

8. The method as recited in claim 1, wherein the corrective action is to display a list of user intents associated with a set of training questions with an NL bias.

9. Apparatus, comprising:

a processor; computer memory holding computer program instructions executed by the processor for detecting natural language (NL) bias by a conversational system, the computer program instructions comprising:

program code, operative to determine an NL bias in one of either a set of training questions used to train a machine learning model used by the conversational system;

program code, operative to select a user intent or a user question received by the conversational system;

program code, operative to determine NL characteristics of the user question and NL characteristics of the set of training questions;

program code, operative to compare the NL characteristics of the user question to the NL characteristics of the set of training questions;

program code, operative to identify the NL bias associated with the machine learning model to preferentially associating the user queries to the user intent; and program code, operative to adjust the NL bias of the training questions or the user question by performing a corrective action, wherein performing the corrective action is based on identifying a distribution of intents, and wherein the corrective action includes retraining the machine learning model; and program code, operative to correctly classify, by the retrained machine learning model, a type of user question as exemplified by the user question.

10. The apparatus as recited in claim 9, wherein the corrective action further comprises selecting a normalizing algorithm based on a determined type of NL bias to compensate for the determined NL bias.

11. The apparatus as recited in claim 9, wherein the corrective action further comprises:

program code responsive to the determining, operative to generate a new set of training questions with NL characteristics selected to be different than the set of training questions; and program code, operative to retrain the machine learning using the new set of training questions.

12. The apparatus as recited in claim 9, wherein the corrective action further comprises program code operative to apply a normalizing algorithm to the received user query so that the NL characteristics of the normalized user query more closely correspond to the NL characteristics of the set of training questions so that the machine learning will associate the user query to a different user intent.

13. The apparatus as recited in claim 9, further comprising program code operative to provide an NL bias detection function utilizing a pipeline staging including a sentence classification module, a filtering module, a bag of words module, and a subject-verb-object (SVO) neural parser.

14. The apparatus as recited in claim 10, further comprising wherein the program code operative to select further comprises program code operative to select from a plurality of normalization algorithms wherein the selected normalizing algorithm compensates for the determined NL bias.

15. A computer program product in a non-transitory computer readable medium for use in a data processing system, the computer program product holding computer program instructions executed by the data processing system for detecting natural language (NL) bias by a conversational system, the computer program instructions comprising:

program code, operative to determine an NL bias in one of either a set of training questions used to train a machine learning model used by the conversational system;

program code, operative to select a user intent or a user question received by the conversational system;

program code, operative to determine NL characteristics of the user question and NL characteristics of the set of training questions;

program code, operative to compare the NL characteristics of the user question to the NL characteristics of the set of training questions;

program code, operative to identify the NL bias associated with the machine learning model to preferentially associating the user queries to the user intent; and program code, operative to adjust the NL bias of the training questions or the user question by performing a corrective action, wherein performing the corrective action is based on identifying a distribution of intents, and wherein the corrective action includes retraining the machine learning model; and program code, operative to correctly classify, by the retrained machine learning model, a type of user question as exemplified by the user question.

16. The computer program product as recited in claim 15, wherein the corrective action further comprises selecting a normalizing algorithm based on a determined type of NL bias to compensate for the determined NL bias.

17. The computer program product as recited in claim 15, wherein the corrective action further comprises:

program code responsive to the determining, operative to generate a new set of training questions with NL characteristics selected to be different than the set of training questions; and program code, operative to retrain the machine learning using the new set of training questions.

18. The computer program product as recited in claim 16, wherein the corrective action further comprises program code operative to apply a normalizing algorithm to the received user query so that the NL characteristics of the normalized user query more closely correspond to the NL characteristics of the set of training questions so that the machine learning will associate the user query to a different user intent.

19. The computer program product as recited in claim 15, further comprising program code operative to provide an NL bias detection function utilizing a pipeline staging including a sentence classification module, a filtering module, a bag of words module, and a subject-verb-object (SVO) neural parser.

20. The computer program product as recited in claim 15, further comprising wherein the program code operative to select further comprises program code operative to select from a plurality of normalization algorithms wherein the selected normalizing algorithm compensates for the determined NL bias.

* * * * *